United States Patent
Kransteuber et al.

(10) Patent No.: US 6,999,176 B1
(45) Date of Patent: Feb. 14, 2006

(54) REAL-TIME OPTICAL CORRELATING SYSTEM

(75) Inventors: Amy Sue Kransteuber, Huntsville, AL (US); Don A. Gregory, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1432 days.

(21) Appl. No.: 09/687,166

(22) Filed: Oct. 16, 2000

(51) Int. Cl.
*G01B 9/02* (2006.01)

(52) U.S. Cl. .................................... 356/457
(58) Field of Classification Search .............. 356/457
See application file for complete search history.

(56) References Cited

U.S. PATENT DOCUMENTS 5,166,742 A * 11/1992 Kobayashi et al. ........ 356/35.5
5,479,257 A * 12/1995 Hashimoto ................ 356/457
6,525,821 B1 * 2/2003 Thomas et al. ............ 356/457

* cited by examiner

*Primary Examiner*—Hwa (Andrew) Lee
(74) *Attorney, Agent, or Firm*—Hay Kyung Chang

(57) ABSTRACT

A Real-Time Optical Correlating System produces holograms that contain both amplitude and phase information and have none of the time constraints of the traditional holographic methods. It has been demonstrated to operate at television field rates (60 Hz) employing currently available devices of moderate resolution. Using the System, the holographic matched filter of an input scene is calculated optically as an analog sum, captured by a charge-coupled device (CCD) camera and transmitted directly or through a computer to and displayed on a commercially available liquid crystal display (LCD) device. The correlation plane may be viewed immediately on a suitable screen because there is no film to process or computer calculations to be performed. Concurrently with the creation of the holographic matched filter of the input scene, a Fourier transform of a test scene is produced and both are imaged on another charge-coupled device camera for any correlation between the input and test scenes.

15 Claims, 2 Drawing Sheets

REAL-TIME OPTICAL CORRELATING SYSTEM

DEDICATORY CLAUSE

The invention described herein may be manufactured, used and licensed by or for the Government for governmental purposes without the payment to us of any royalties thereon.

BACKGROUND OF THE INVENTION

In traditional holography and holographic image processing, the interference pattern is recorded on high-resolution film. More recently, digital computation of holograms has become possible if information about the object and the desired reconstruction angle is known. With either of these methods, however, reconstructing a viewable image from a stored hologram requires that either the film be developed, which can take an hour or more to process and dry or that the digitally computed hologram be displayed on a high-resolution electrically addressable display device which can require on the order of several minutes to compute the hologram from a collection of digitized two dimensional images. (A third technique, which is not truly holographic, employs several projectors and a rotating spiral screen to produce a real, three-dimensional image capable of being viewed on the screen from any angle.)

For years, holography has been exploited in optical pattern recognition through optical correlation. In optical correlation applications, the holographic filter must be captured optically on film or computed digitally and displayed on high-resolution devices, just as in the traditional process alluded to above with all the attendant time and processing limitations. Therefore, most of the filters computed today are not true holographic filters containing both amplitude and phase information but are phase conjugating filters that contain only phase information. The phase conjugating filters, though not containing as much information as holographic filters, are used because they are easier to compute.

SUMMARY OF THE INVENTION

A Real-Time Optical Correlating System 200 (hereinafter referred to as the "System") as described in detail below produces holograms that contain both amplitude and phase information yet have none of the time constraints of the traditional holographic methods. It has been demonstrated to be operable at television field rates (60 Hz). Using the System, the holographic matched filter of input scene 139 is calculated optically as an analog sum, captured by first charge-coupled device (CCD) camera 125 and transmitted via computer 127 to and displayed on a commercially available liquid crystal display (LCD) device 137. The holographic reconstruction may be viewed immediately on suitable screen 151 because there is no film to process or computer calculations to be performed. Concurrently with the creation of the holographic matched filter of the input scene, a Fourier transform of test scene 141 is produced and both are imaged on second charge-coupled device camera 129 for any correlation between the input and test scenes. Since the System operates at television field rates, the holographic matched filter can be updated every 1/60 of a second.

DESCRIPTION OF THE PREFERRED EMBODIMENT

Figure 1:
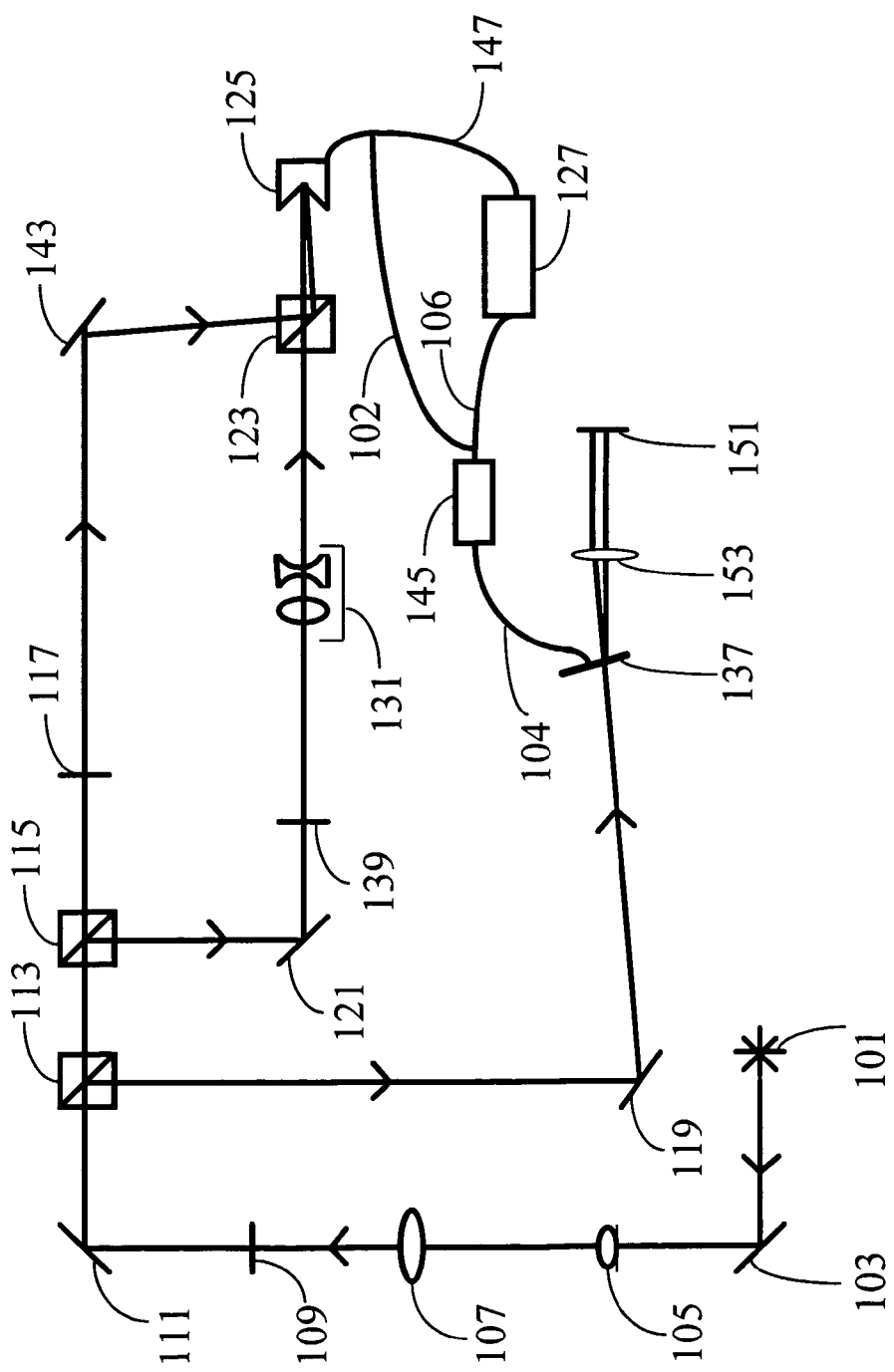
FIG. 1 shows a configuration of components used in recording and reconstructing a hologram of an input scene.
Figure 2:
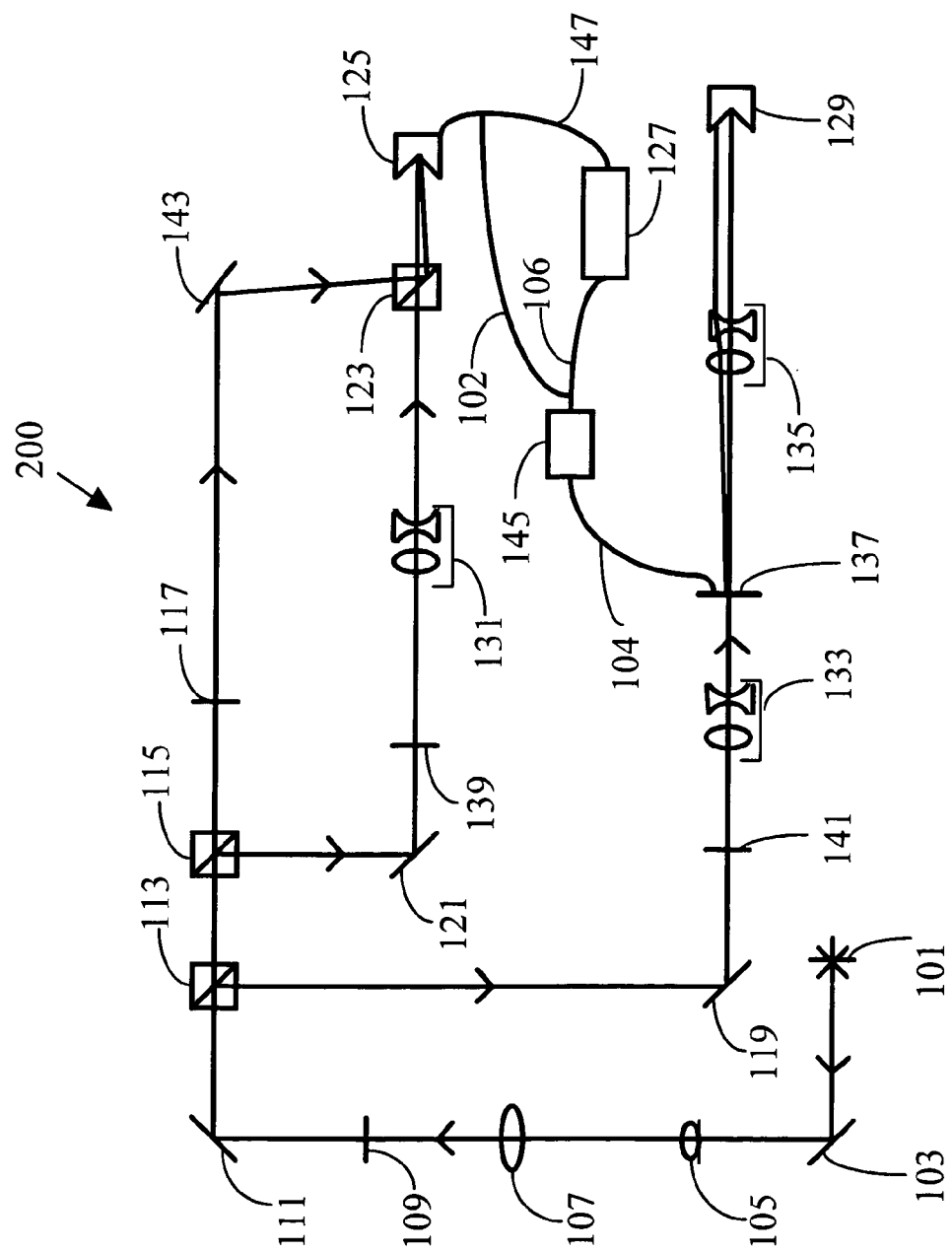
FIG. 2 illustrates a preferred embodiment of the Real-Time Optical Correlating System.

Referring now to the drawing wherein like numbers represent like parts in each of the figures and arrows indicate optical paths, FIG. 1 shows the part of the Real-Time Optical Correlating System that produces and reconstructs a hologram of input scene 139. Since FIG. 2 subsumes FIG. 1 as a necessary part of the entire Real-Time Optical Correlating System, subsequent explanation of the operation of the System is given with reference mostly to FIG. 2.

I. Recordation and Reconstruction of a Hologram of Input Scene 139.

Initially, a suitable laser source 101, such as a 15-milliwatt neodymium-doped yttrium vanadate laser ($Nd:YVO_4$), emits an original laser beam of an appropriate wavelength, such as 532 nanometers. It is directed by first mirror 103 to impinge on spatial filter 105 whereby it is cleaned and rendered to be more Gaussian in nature. Thence, the original beam travels through collimating lens 107 which may be any positive lens and through linear polarizer 109 which ensures that the beam is linearly polarized before it is incident on second mirror 111. From the second mirror, the original beam impinges on first beamsplitter 113 and is divided thereby into two portions, one portion being reflected and sent toward third mirror 119 and the other portion being transmitted through the first beamsplitter toward second beamsplitter 115. The transmitted portion is further divided by the second beamsplitter into an object beam and a reference beam to be incident on fourth mirror 121 and fifth mirror 143, respectively. From the fourth mirror, the object beam travels through input scene 139 which is then encoded onto the object beam, through first lens combination 131 and third beamsplitter 123 which, like the first and second beamsplitters, may be non-polarizing cube beamsplitters. At the third beamsplitter, the object beam is intersected at a small angle by the reference beam reflected from fifth mirror 143 and is recombined with the reference beam at first charge-coupled device (CCD) camera 125 (example: PULNiX model TM-7CN). This recombination forms an optical interference pattern on the first CCD. Half-wave plate 117 is used to rotate the polarization of the reference beam so that at the first CCD, the polarizations of the reference and object beams are parallel.

The lens combination 131 may form at the first CCD a scaled Fourier transform pattern or a Fresnel diffraction pattern of the input scene. Adjusting the lens combination (focal lengths and separation) and the location of the input scene allows the creation of a hologram of the input scene or of the Fourier transform or Fresnel transform of the input scene. However, for the use of System 200 as a correlator, it is essential to create a holographic matched filter of the input scene. Such a holographic matched filter is created when first lens combination 131 is positioned between the input scene and first CCD 125 so that the first lens combination is one effective focal length away from the input scene as well as one effective focal length away from the first CCD. In this configuration, the optical interference pattern formed at the first CCD is a holographic matched filter of the input scene.

Upon formation, the holographic matched filter is detected by first CCD 125 which, in response, generates corresponding video signals. The video signals are captured via wire connection 147 by a framegrabber card (example: Data Translation board, DT 2255-60 Hz) residing in computer 127 and either stored therein or further transmitted. If further transmitted, the signals are sent, via conventional wire connection 106, to converter 145 which converts the signals to video that can be displayed at liquid crystal display (LCD) 137 (example: Kopin LVGA Evaluation Model). One of the benefits of passing the video signals through the computer is that before the signals are sent to the LCD, they may be modified to achieve, for instance, scaling or contrast enhancement. Another benefit is that if the holograms are stored, they can be quickly recalled and sent to the LCD as necessary. However, if storage or modification is not desired, the video signals can be transmitted directly from CCD 125 to converter 145 through wire connection 102 and still achieve real-time operation of the System. All wire connections consist of conventional wires.

When the light that is reflected by first beamsplitter 113 is steered by third mirror 119 to illuminate LCD 137, the light is encoded, upon passing through the LCD, with information about the optical interference pattern now displayed on the LCD. This light illuminating the LCD is similar to the reference beam used during the holographic formation. Generally, illumination of a hologram with a beam similar to one of the constituent beams (in this case, the reference beam) creates (diffracts) light that is proportional to the other constituent beam (here, the object beam), these similar beam and proportional light together forming a small angle at the LCD. An observer can view the recreated input scene as it is imaged on screen 151. Lens 153 may assist in the imaging of the input scene on the screen.

II. Optical Correlation of Input Scene 139 and Test Scene 141.

An optical correlator compares previously recorded or stored information (scenes) with scenes of interest (test scenes). The magnitude of the optical correlation signified by the correlation peak that appears on second CCD 129 indicates how closely the scene of interest matches a stored scene. When the hologram displayed on LCD 137 is a holographic matched filter made from the Fourier transform of the input scene 139, it can be used as a part of the operation of System 200 as an optical correlator. Simultaneously with or subsequent to the creation and display on the LCD of the holographic matched filter of input scene 139, a Fourier transform of test scene 141 is created and displayed on LCD 137 by positioning second lens combination 133 between the test scene and the LCD at its effective focal length away from both the test scene and the LCD. Thereafter correlation of the two scenes is incident on second CCD 129. Third lens combination 135 positioned its effective focal length away from both the LCD and the second CCD focuses the correlation plane at the second CCD.

The joint use of high-resolution first CCD 125 and phase modulating liquid crystal display unit 137 allows real-time holograms to be detected and displayed. The hologram may be updated as quickly as the System's slowest component's update rate. CCD 125, the computer framegrabber and the LCD chosen for this System all operate at field rate (60 Hz), so the System can update and reconstruct the input scene every 1/60 of a second. This is immensely faster than the several minutes to an hour or more delay for computer-generated or traditionally recorded holograms.

The Real-Time Optical Correlating System described above employs currently available devices of moderate resolution, so the autocorrelations are limited to simple objects. However if the trend in device technology development continues, holograms of more complex and detailed objects may soon be processed with the System. Possible applications include product inspection and three-dimensional displays. Another application of the pattern recognition capability of the System is processing radar signals for target cueing or identifying aircraft for air traffic control since it is not necessary to have a scene, in a visual sense, for the proper operation of the System. Any signal can be used as the input.

Therefore, although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A real-time optical correlating system, said system comprising: a means for recording a holographic matched filter of an input scene; a means for reconstructing said holographic matched filter; a means for connecting said recording and reconstructing means; a means for creating a Fourier transform of a test scene, said Fourier transform being incident on said reconstructing means; and a means for viewing said holographic matched filter and said Fourier transform together for correlation between said input and test scenes.

2. A real-time optical correlating system as set forth in claim 1, wherein said recording means comprises: a source of original laser beam; a means for providing a reference beam and an object beam from said original laser beam, said object beam having encoded thereon said input scene; a means for encoding said object beam with said input scene; a means for combining said reference and object beams to produce an interference pattern of said input scene, said reference and object beams together forming a first beam angle of a pre-selected magnitude; and a first charge-coupled device (CCD) camera for detecting said interference pattern and, in response thereto, produce corresponding video signals.

3. A real-time optical correlating system as set forth in claim 2, wherein said system further comprises: a first beamsplitter positioned to receive and divide said original laser beam issuing from said source into a first beam portion and a second beam portion.

4. A real-time optical correlating system as set forth in claim 3, wherein said means for providing a reference beam and an object beam comprises a second beamsplitter for dividing said first beam portion.

5. A real-time optical correlating system as set forth in claim 4, wherein said encoding means comprises a first lens combination, said first lens combination being positioned one effective focal length away from said input scene in one direction and one effective focal length away from said first CCD in the opposite direction.

6. A real-time optical correlating system as set forth in claim 5, wherein said reconstructing means comprises a liquid crystal display (LCD) positioned to intercept said second beam portion.

7. A real-time optical correlating system as set forth in claim 6, wherein said connecting means comprises a computer coupled between said first CCD and said LCD, said computer having a framegrabber therein and receiving said video signals from said first CCD and transmitting said signals to said LCD to be imaged thereon as a holographic matched filter of said input scene upon the incidence of said second beam portion on said LCD.

8. A real-time optical correlating system as set forth in claim 7, wherein said means for creating a Fourier transform of a test scene is a second lens combination positioned one effective focal length away from the test scene in one direction and one effective focal length away from said LCD in the opposite direction, said test scene and said second lens combination being aligned to intercept said second beam portion prior to the incidence of said second beam portion on said LCD to create thereon a Fourier transform of said test scene.

9. A real-time optical correlating system as set forth in claim 8, wherein said means for viewing said holographic matched filter and said Fourier transform for correlation between said input and test scenes comprises a second charge-coupled device (CCD) and a third lens combination, said third lens combination being positioned between said LCD and said second CCD, one effective focal length away from either, said second CCD being adapted to receive said holographic matched filter and said Fourier transform from said LCD and image them together for correlation therebetween.

10. A real-time optical correlating system as set forth in claim 9, wherein said system still further comprises several mirrors located strategically so as to steer said beams along pre-determined paths within said system.

11. A real-time optical correlating system, said system comprising: a means for making and displaying an interference pattern of an input scene; a means for creating a Fourier transform of a test scene; and a means for viewing said interference pattern and said Fourier transform together for correlation between said input and test scenes.

12. A real-time optical correlating system as set forth in claim 11, wherein said making and displaying means comprises: a Mach-Zehnder architecture for providing a reflected beam, a reference beam and an object beam, said reference and object beams subsequently combining to yield said interference pattern of an input scene; a liquid crystal display (LCD) unit coupled to receive said interference pattern, said LCD unit being aligned to be illuminated by said reflected beam and creating a light proportional to said object beam in response to said illumination; and a means for receiving said reflected beam and said proportional light from said LCD and producing therefrom an observable holographic image of the input scene.

13. A real-time optical correlating system as set forth in claim 12, wherein said means for creating a Fourier transform of a test scene comprises a test scene placed in the path of said reflected beam prior to its incidence on said LCD unit and a lens combination, said lens combination being positioned between said LCD unit and said receiving means and one effective focal length away from said LCD unit and said receiving means.

14. A real-time optical correlating system as set forth in claim 13, wherein said reference and object beams, upon combination, form a first angle and said reflected beam and said proportional light form a second angle upon departure from said LCD unit toward said receiving means.

15. A real-time optical correlating system as set forth in claim 14, wherein said receiving means is a charge-coupled device suitable for viewing correlation plane.

\* \* \* \* \*